United States Patent [19]
Giovanni

[11] Patent Number: 5,441,314
[45] Date of Patent: Aug. 15, 1995

[54] THREADED FITTINGS

[76] Inventor: Camozzi Giovanni, via Tito Speri 9, 25065 Lumezzane (BS), Italy

[21] Appl. No.: 269,767

[22] Filed: Jul. 1, 1994

[51] Int. Cl.$^6$ .................................. F16L 41/08
[52] U.S. Cl. ............................ 285/211; 285/220; 285/332.2; 277/168
[58] Field of Search .............. 285/220, 332.2, 332.3, 285/211, 212; 277/121, 168, 117

[56] References Cited

U.S. PATENT DOCUMENTS

| | | | |
|---|---|---|---|
| 2,246,436 | 6/1941 | Downey | 285/906 X |
| 2,342,425 | 2/1944 | Parker | 285/220 |
| 2,759,743 | 8/1956 | Bloom | 285/220 X |
| 3,275,348 | 9/1966 | Scott | 285/212 |
| 3,606,358 | 9/1971 | Tobler | 285/220 X |
| 4,531,767 | 7/1985 | Andreolla | 285/220 |
| 4,595,219 | 6/1986 | Lenze et al. | 285/332.2 X |
| 4,770,448 | 9/1988 | Strickland et al. | 285/333 |
| 5,188,402 | 2/1993 | Colgate et al. | 285/332.2 X |

FOREIGN PATENT DOCUMENTS

| | | | |
|---|---|---|---|
| 571178 | 12/1957 | Italy | 285/332.3 |
| 4000085 | 1/1992 | Japan | 285/220 |
| 487564 | 6/1938 | United Kingdom | 285/332.3 |
| 953359 | 8/1963 | United Kingdom | 285/220 |

*Primary Examiner*—Randolph A. Reese
*Assistant Examiner*—Heather Chun Shackelford
*Attorney, Agent, or Firm*—Thomas S. Baker, Jr.

[57] ABSTRACT

An externally threaded fitting for use in coupling a fluid-conducting tube to a fluid-processing system threaded entrance opening is provided with a tapered-bottom groove immediately above and adjacent the fitting external thread, and with a doubly-tapered, polytetrafluoroethylene material seal element contained in the tapered-bottom groove. Upon proper installation in the system threaded entrance opening, the doubly-tapered seal element is fully isostatically compressed with total concealment of fitting external threads.

5 Claims, 2 Drawing Sheets

THREADED FITTINGS

FIELD OF THE INVENTION

This invention relates generally to threaded fittings for use with pneumatic tubing or the like, and particularly concerns a threaded fitting design and construction which does not require the subsequent use of thread-sealing tapes or compounds to eliminate fitting fluid leakage around the fitting threads.

BACKGROUND OF THE INVENTION

It is common practice when installing pneumatic tubing fluid lines using threaded tube fittings to wrap the fitting threads with a sealant tape, such as a polytetrafluoroethylene ("Teflon") tape, or to coat such fitting threads with a liquid or paste-like sealant compound for leakage control purposes. In either case there is a substantial risk of possible subsequent defiling of cooperating pneumatic system components or fluids by loose or excess particles of the sealant utilized.

Based on experience derived from the practice of the invention described and claimed in this application, it is now known the total fluid sealing of pneumatic tube threaded fittings in an installation may be achieved without having to cover or coat the fitting threads with an adhering sealant.

Experience with the invention to date also establishes that the new and improved method of achieving fitting fluid sealing does not to any degree compromise otherwise obtained fitting full-flow, low-profile, and rapid installation characteristics, Also, the fitting design and construction disclosed and claimed herein permits subsequent re-use of the threaded fitting without having to replace the included captured ring seal and without having to utilize any of the aforementioned conventional sealant elements.

Additionally, when properly installed, the threaded fitting of this invention leaves no exposed threads to collect debris external to the system.

Other objects and advantages of the present invention will become apparent during a careful consideration of the detailed descriptions and drawings which follow.

SUMMARY OF THE INVENTION

The threaded fitting of this invention is basically comprised of a threaded male element having an included novel, doubly-tapered seal. A cooperating female thread, which may be typically incorporated into a fluid-receiving container, a flow-control device, a fluid coupling, or the like, has a threaded bore of proper size and with a chamfered bore entrance or opening of specified depth and taper. The threaded male element of the invention, which typically may have a connector, elbow, or tee configuration, and be either fixed or swiveled, has an external male thread of proper size and an included doubly-tapered captured ring seal that upon proper installation is compressed by the female thread tapered entrance. The included captured and doubly-tapered ring seal of the threaded male element is also compressed by a tapered groove portion of the male element body and by a flat under-surface of that body's nut-like body portion.

DETAILED DESCRIPTION

Figure 1:
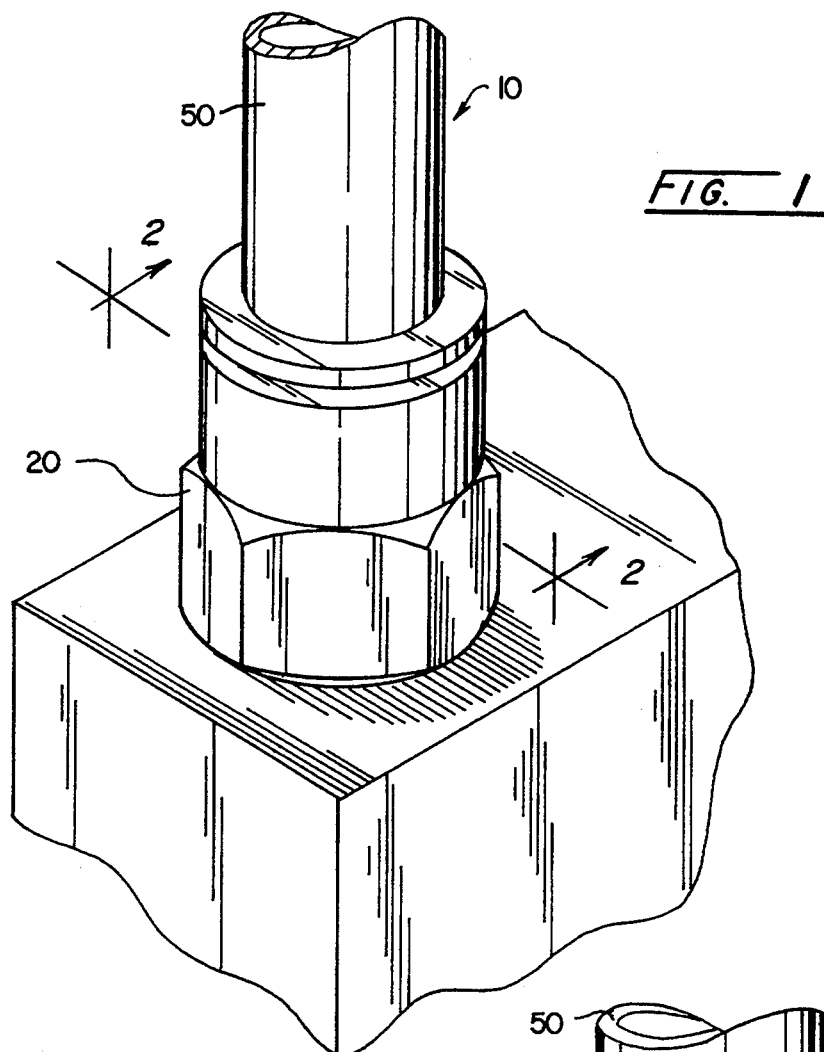
FIG. 1 is an elevational view of a preferred embodiment of the threaded fitting of this invention in a connector configuration.
Figure 2:
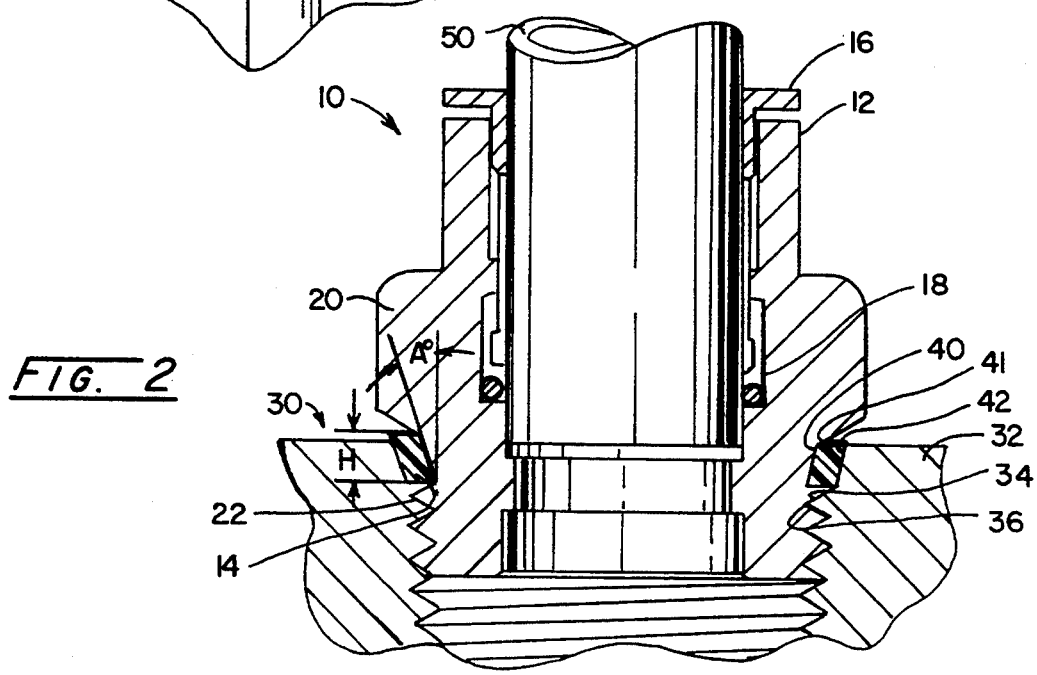
FIG. 2 is a partially-sectioned view along line 2—2 of FIG. 1.

FIGS. 1 and 2 illustrate a threaded fitting assembly (10) which is constructed in accordance with this invention. Assembly (10) is basically comprised of a partially-threaded body element (12) and a doubly-tapered, ring-like or annular seal element (14) that typically is fabricated of a polytetrafluoroethylene ("Teflon") material. In addition, threaded fitting assembly (10), which has a so-called connector configuration, includes collet element (16) and an internal O-ring element (18) which are provided for sealably anchoring the end of a flexible fluids conductor such as a nylon tube or tubing element in assembly (10). Also as shown in FIG. 2, threaded body element (12) is provided with an integral external nut-like portion (20) as well as with the externally-threaded integral male body portion (22). Body portion (20) may alternatively have an external configuration different than the conventional hexagonal nut configuration illustrated, but in any event it must have an undersurface (41) of radial extent that defines the hereinafter described groove element (40). In most applications involving threaded fittings for tubing in the nominal external diameter size range of from one-eighth inch diameter to one-half inch diameter fitting body portion (22) is provided with a NPTF (National Pipe Thread-Fine) thread.

Threaded fitting assembly (10) is designed for cooperation with the schematic fluid system component illustrated and designated generally as (30) in FIG. 2. As suggested above, component (30) may have the function of a container for receiving or discharging fluids from or to the fluid line connected to fitting (10), or of a fluid flow control device, or of any other fluid-processing component in a fluids-handling system. System component (30) is provided with wall (32) having a threaded entrance bore (34). Entrance bore (34) in turn has an internal (female) thread (36) that has a thread configuration that corresponds to the thread configuration of fitting body portion (22) shown in FIG. 1.

In order to avoid the need for a sealant material such as a tape or liquid or paste-like sealing compound being applied to the threads of either fitting body portion (22) or receiving bore (32) and yet obtain total leakage elimination, and especially in the case of pneumatic system applications, threaded fittings (10) and threaded system component (30) are provided with a novel and extremely effective seal arrangement.

First, threaded fitting body element (12) is provided with a tapered annular groove (40). Groove (40) extends axially of fitting body element (12) a distance 'H' from the flat undersurface of body element nut portion (20) to the uppermost thread of threaded body element portion (22) and also extends inwardly of the thread root diameter by the radial thickness of seal element (14). In addition, the tapered surface of groove (40) is at an angle 'A' relative to the longitudinal axis of fitting assembly (10). For most intended applications of this invention it is preferred that the angle 'A' be in the range of from 10 degrees to 20 degrees.

Second, system component (30) is provided with an internal entrance chamfered surface (42) that essentially corresponds to the tapered surface of groove (40) in a taper angle ('A') and axial extent ('H'). The radius of chamfer (42) essentially corresponds to the maximum radius of annular seal element (14).

FIG. 2 illustrates the fully-engaged relationship of threaded fitting assembly (10) with fluid system component (30) when properly combined. In such fully-engaged relationship, the material of doubly-tapered annular seal element (14) is totally isostatically compressed to provide complete sealing against fluid leakage through the pathways defined by the surfaces of thread portions (22 and 36). A portion of a flexible fluid tube (50) anchored in fitting assembly (10) is illustrated in FIG. 2.

Figure 3:
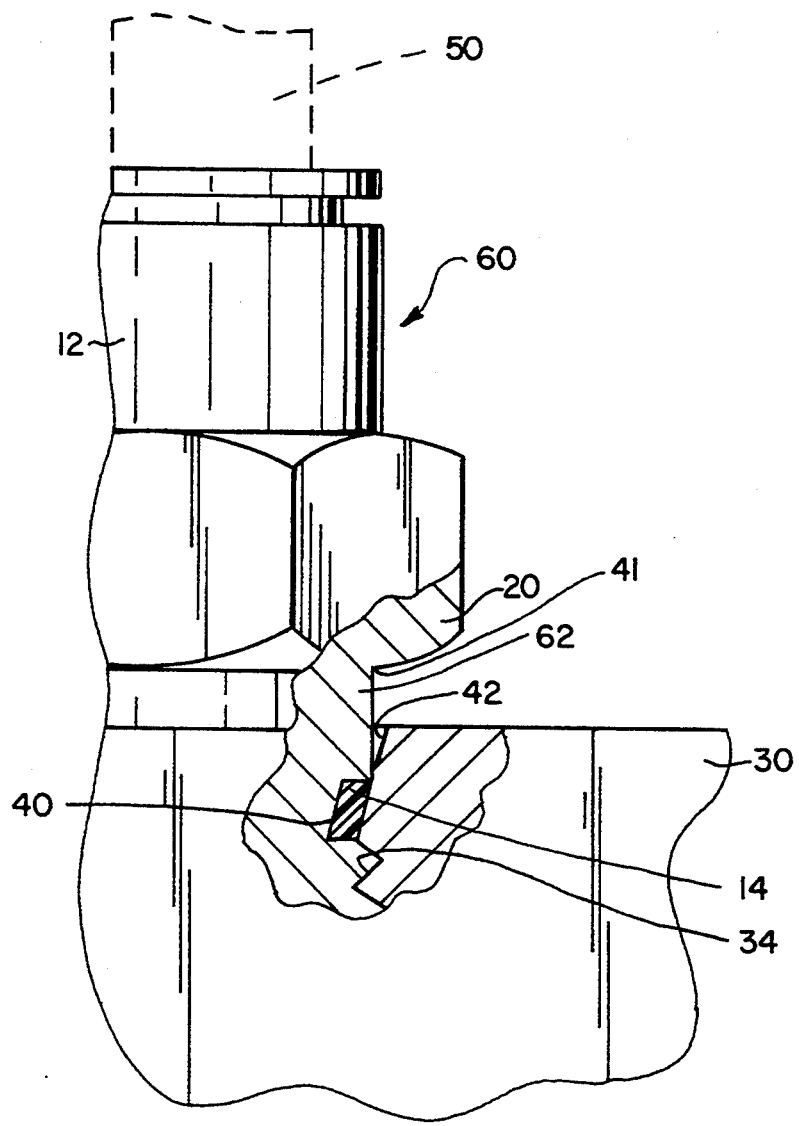
FIG. 3 is a partially-sectioned elevational view but of another embodiment of the threaded fitting of this invention.

In FIG. 3 I provide details of another embodiment of the present invention. Such embodiment is designated generally as 60 and differs from the embodiment of FIGS. 1 through 3 in that body element (12) is provided with an integral shoulder portion (62) which is positioned immediately below nut-like body portion (20) and intermediate that body portion and tapered groove element (40). This particular embodiment, while having the same sealing characteristics as embodiment (10), does obtain installation advantages in situations where the chamfered surface or entrance (42) to threaded opening (34) is not controlled as to depth and becomes excessive. As shown in the FIG. 3 installation, with the shoulder portion (62) included in fitting body (12) the shoulder portion engages chamfered surface (42) to complete seal effectiveness before the undersurface of nut-like body portion (20) makes contact with the upper or outer surface of component (30) and thereby prevents completion of the seal formation.

Preferably, in most applications fitting body element (12) is fabricated from a forged brass alloy and is subsequently often provided with a nickel plating as a protective finish. Other materials, component shapes, and component sizes may be utilized in the practice of this invention.

Since certain changes may be made in the above-described system and apparatus without departing from the scope of the invention herein and above, it is intended that all matter contained in the description or shown in the accompanying drawings shall be interpreted as illustrative and not in a limiting sense.

I claim the following:

1. In a threaded fitting for installation in a threaded bore having a chamfered surface defining an entrance bore to said threaded bore in a fluid system, in combination:

a body element having a fluid passageway along its longitudinal axis and with a first body element portion at one of its longitudinal extremes having an external thread, a second body element portion at the other of its longitudinal extremes having a tube entrance opening, and a third body element portion intermediate said first and second body element portions having a circumferential horizontal top wall, a circumferential horizontal bottom wall and a circumferential tapered wall which connects said top wall and said bottom wall which define a tapered groove;

an annular, double-tapered seal element contained in said third body element portion tapered groove such that said seal element moves along said longitudinal axis when said body element moves along said axis, said seal element having a tapered external surface with a minimum external radius which is substantially equal to the root radius of said first body element portion external thread, a tapered internal surface separated from said tapered external surface by the thickness of said seal element defined by the distance between said tapered internal and external seal surfaces, and wherein said seal element tapered external surface engages said chamfered surface when said first body element is threaded into said threaded bore.

2. The threaded fitting defined by claim 1 wherein said tapered groove circumferential tapered wall is angled in the range of approximately 10 degrees to approximately 20 degrees with respect to the longitudinal axis of said threaded fitting passageway.

3. The threaded fitting defined by claim 1 wherein said second body element portion has an under-surface which defines said circumferential horizontal top wall of said third body element portion tapered groove, said under-surface having a radial extent which is at least as large as the maximum radial extent of said double-tapered seal element such that said circumferential horizontal top wall overlies said seal element.

4. The threaded fitting defined by claim 1 wherein said third body element has a shoulder portion and said second body element portion has an under-surface, said third body element shoulder portion being positioned intermediate said second body portion under-surface and said tapered groove such that said shoulder portion is adjacent said circumferential horizontal top wall of said groove, and wherein the maximum radial extend of said shoulder portion is less than the maximum radial extent of said chamfered surface.

5. The threaded fitting defined by claim 1, wherein said seal element is fabricated from polytetrafluoroethylene.

* * * * *